(12) United States Patent
Douglas (10) Patent No.: US 12,404,195 B2
(45) Date of Patent: *Sep. 2, 2025

(54) PROCESS FOR REMOVING SILICA AND REDUCING TOTAL HARDNESS FROM WATER

(71) Applicant: Commonwealth Scientific and Industrial Research Organisation, Acton (AU)

(72) Inventor: Grant Douglas, Acton (AU)

(73) Assignee: COMMONWEALTH SCIENTIFIC AND INDUSTRIAL RESEARCH ORGANISATION, Acton (AU)

( * ) Notice: Subject to any disclaimer, the term of this patent is extended or adjusted under 35 U.S.C. 154(b) by 1244 days.

This patent is subject to a terminal disclaimer.

(21) Appl. No.: 17/144,339

(22) Filed: Jan. 8, 2021

(65) Prior Publication Data

US 2021/0130211 A1    May 6, 2021

Related U.S. Application Data

(63) Continuation-in-part of application No. 16/645,358, filed as application No. PCT/AU2018/050967 on Sep. 6, 2018.

(30) Foreign Application Priority Data

Sep. 8, 2017   (AU) ................................ 2017903640
Apr. 5, 2018   (AU) ................................ 2018901121

(51) Int. Cl.
  *C02F 5/08*   (2023.01)
  *C02F 1/28*   (2023.01)
  (Continued)

(52) U.S. Cl.
  CPC .............. *C02F 5/083* (2013.01); *C02F 1/281* (2013.01); *C02F 1/42* (2013.01); *C02F 1/66* (2013.01);
  (Continued)

(58) Field of Classification Search
  None
  See application file for complete search history.

(56) References Cited

U.S. PATENT DOCUMENTS 5,114,898 A      5/1992  Pinnavaia et al.
5,785,938 A  *   7/1998  Pinnavaia ................ B01J 20/06
                                                        423/532

(Continued)

FOREIGN PATENT DOCUMENTS

EP       2837602 A1    2/2015
EP       1251116 A1   10/2022
                 (Continued)

OTHER PUBLICATIONS

International Search Report for corresponding PCT application No. PCT/AU2018/050967, mailed Oct. 23, 2018.
(Continued)

*Primary Examiner* — Hayden Brewster
(74) *Attorney, Agent, or Firm* — Crowell & Moring LLP (57) ABSTRACT

A process for removing silica and reducing total hardness of a natural or waste water containing silica and scale-forming ions comprises adding (i) magnesium hydroxide or a precursor of magnesium hydroxide and (ii) a soluble aluminate compound or a precursor of aluminate to said water while maintaining the pH of said stream at pH>8 to produce a layered double hydroxide in situ, wherein the layered double hydroxide contains the scale-forming ions in a lattice of the layered double hydroxide and silica is incorporated in the lattice of the layered double hydroxide as an interlayer anion (Continued)

and/or bound by the layered double hydroxide via one or more binding modes, wherein the process further comprises a recycling and regeneration step and/or a hydroxide addition step.

18 Claims, 1 Drawing Sheet

(51) Int. Cl.

| | | |
|---|---|---|
| *C02F 1/42* | (2023.01) | |
| *C02F 1/66* | (2023.01) | |
| *C02F 5/02* | (2023.01) | |
| *C02F 101/10* | (2006.01) | |
| *C02F 101/30* | (2006.01) | |
| *C02F 101/32* | (2006.01) | |
| *C02F 101/36* | (2006.01) | |

(52) U.S. Cl.
CPC ............ *C02F 5/02* (2013.01); *C02F 2101/10* (2013.01); *C02F 2101/301* (2013.01); *C02F 2101/32* (2013.01); *C02F 2101/36* (2013.01); *C02F 2101/40* (2013.01); *C02F 2303/16* (2013.01)

(56) References Cited

U.S. PATENT DOCUMENTS

| 2007/0256982 A1 | 11/2007 | Kelley et al. |
| 2009/0184058 A1 | 7/2009 | Douglas |
| 2012/0228229 A1 | 9/2012 | Douglas |
| 2016/0052949 A1* | 2/2016 | Beckham .............. C10G 1/086 568/322 |
| 2017/0029306 A1 | 2/2017 | Ukai et al. |
| 2019/0256388 A1 | 8/2019 | Nagghappan et al. |

FOREIGN PATENT DOCUMENTS

| JP | 2004-141799 A | 5/2004 |
| JP | 2012-106227 A | 6/2012 |
| JP | 2012106277 A | 6/2012 |
| KR | 10-2013-0056356 | 5/2013 |
| TW | 201249754 A | 12/2012 |
| WO | WO 2002/10104 A1 | 7/2001 |
| WO | WO 2012/056826 A1 | 5/2012 |
| WO | WO 2013/153587 A1 | 11/2012 |
| WO | WO/2019/046897 | 3/2019 |

OTHER PUBLICATIONS

International Written Opinion for corresponding PCT application No. PCT/AU2018/050967, mailed Oct. 23, 2018.
Extended European Search Report for corresponding European application No. 18854464.7, 7 pgs., mailed Apr. 6, 2021.
Office Action for Chinese Patent Applicaiton No. 201880071161.6, dated Dec. 27, 2012, 33 pgs. (w/English Translation).
Final Office Action from co-pending U.S. Appl. No. 16/645,358, dated Jun. 23, 2023, 20 pgs.
Japanese Office Action for Japanese Patent Application No. 2020-513835 dated Jun. 14, 2022, w/English Translation.
Apec, Silica in Drinking Water, Dec. 25, 2015 (Year: 2015).
Non-Final Office Action from co-pending U.S. Appl. No. 16/645,358, dated Oct. 5, 2022, 21 pgs.
Reply to Non-Final Office Action from co-pending U.S. Appl. No. 16/645,358, dated Feb. 6, 2023, 11 pgs.

* cited by examiner

PROCESS FOR REMOVING SILICA AND REDUCING TOTAL HARDNESS FROM WATER

CROSS-REFERENCE TO RELATED APPLICATIONS

This application is a continuation-in-part of U.S. application Ser. No. 16/645,358, having a 371(c) date of Mar. 6, 2020, which is the U.S. National Stage application of PCT application No. PCT/AU2018/050967, filed on Sep. 6, 2018, titled "Water Treatment Process," designating the United States, which claims priority to Australian Patent Application 2018901121, filed Apr. 5, 2018, and which also claims priority to Australian Patent Application No. 2017903640, filed Sep. 8, 2017, which are incorporated herein by reference.

TECHNICAL FIELD

The present disclosure relates to a water treatment process, in particular to a process for removing silica and reducing total hardness of a natural or waste water containing silica and scale-forming ions.

BACKGROUND

The following discussion of the background to the invention is intended to facilitate an understanding of the invention. However, it should be appreciated that the discussion is not an acknowledgment or admission that any of the material referred to was published, known or part of the common general knowledge as at the priority date of the application.

A process for effective removal of silica, total hardness (as dissolved Ca+Mg) and particulate and colloidal materials from natural or waste waters constitutes a major challenge for a range of industries or sectors as diverse as, for example, textiles or coal, prior to reuse or discharge or for surface and groundwater treatment for potable water supplies.

Currently a range of technologies may be used, often in sequential combination to achieve the above aims. Suitable examples include one or more of, but not limited to, microfiltration, ultrafiltration, reverse or forward osmosis, ion exchange, chemical precipitation, flocculation, sand (depth) filtration and (ultra)centrifugation.

In respect of silica removal, calcined magnesia or magnesium hydroxide have been used to remove silica from a variety of natural and waste waters with varying degrees of success. Alternatively, both prepared (preformed) layered double hydroxides (including layered double hydroxide) or calcined derivatives have been used to remove silica from natural or waste waters. Japanese Patent Publication No. JP 2012106227 (A) teaches that the structure of the hydrotalcite incorporating the dissolved silica and the hydrotalcite removal efficiency reduces when the Si concentration is higher than 20 mg/L, and recommends pretreating water with a silica content above this threshold by adding a neutralizing agent such as NaOH or $Ca(OH)_2$ and adjusting the pH of the water to pH 5 to 10 so as to first form a co-precipitate of iron or aluminium hydroxide with dissolved silica and silicate ions. The co-precipitate is subsequently separated to produce water with a Si concentration of less than 10 mg/L. This pre-treatment step introduces complexity and additional capital and operational expenditure into a treatment plant to deal with a high Si content water.

There are a range of benefits associated with concurrently treating water to remove silica and reduce hardness/ionic strength, not only those outlined above, but also concomitant downstream benefits for the utilisation of other technologies such as reverse osmosis where the potential for membrane fouling (and increased operational costs) are mitigated in particular by reduced silica and total hardness.

To date, however, there appears to be no technology that is able, in the absence of one or more pretreatment steps to partially reduce the concentration of silica or other contaminants, to simultaneously remove silica (here defined as dissolved, polymeric, colloidal or particulate forms which may vary according to solution composition and pH), reduce hardness, remove particulate (>1 μm) and colloidal (<1 μm) moieties, and in many cases also reduce the ionic strength of the treated water.

Thus, there is a need to develop an alternative and more efficient process for treating water to remove silica and reduce total hardness.

SUMMARY

Unexpectedly, and serendipitously, the testing of a range of natural and waste waters spanning a considerable range of ionic compositions, ionic strength, pH, suspended solids and other water quality parameters has revealed that in-situ precipitation of a range of layered double hydroxide minerals, with a range of compositions, including one or more of layered double hydroxide, hydrotalcite, calcium containing layered double hydroxide or analogues, related minerals, or mixtures thereof and incorporating dissolved elements, species or complexes contained within the natural or waste water as structural components, may achieve at least some of the aforementioned desirable outcomes. In particular, and counterintuitively, the inventor has found that increasing the concentration of magnesium in hard water by adding magnesium hydroxide or a precursor of magnesium hydroxide has a net 'softening' effect because scale-forming ions, such as magnesium, are incorporated into a lattice of a layered double hydroxide, in particular hydrotalcite as it forms in situ.

The inventor has found that silica may be simultaneously removed with the scale-forming ions without needing to employ one or more pretreatment steps to reduce the concentration of silica in the natural or waste water.

The inventor has also found that the process described herein may be augmented by calcination and recycling/regeneration steps allowing for enhanced and repeated removal of silica and total hardness, hitherto unknown, to facilitate major process advantages in terms of increased solute recovery and cost reductions compared to existing technologies.

In one aspect of the disclosure there is provided a process for removing silica and reducing total hardness of a natural or waste water containing silica and scale-forming ions, the process comprising: adding (i) magnesium hydroxide or a precursor of magnesium hydroxide and (ii) a soluble aluminate compound or a precursor of aluminate to said water while maintaining the pH of said stream at pH>8 to produce layered double hydroxide in situ, wherein the layered double hydroxide contains the scale-forming ions in a lattice of the layered double hydroxide and silica is incorporated in the lattice of the layered double hydroxide as an interlayer anion and/or bound by the layered double hydroxide via one or more binding modes; wherein the process further comprises a recycling and regeneration step and/or a hydroxide addition step;

wherein the recycling and regeneration step comprises:
a) removing layered double hydroxide precipitate;
b) regenerating and/or recycling at least a portion of the layered double hydroxide removed from the process to form regenerated layered double hydroxide; and
c) reintroducing the regenerated and/or recycled layered double hydroxide back into the process;

wherein the hydroxide addition step comprises addition of one or more hydroxides, wherein the one or more hydroxides may be selected from the group consisting of i) layered double hydroxide, ii) calcined layered double hydroxide, and iii) layered double hydroxide forming agents or substrates such as magnesium hydroxide or a precursor of magnesium hydroxide, and/or a soluble aluminate compound or a precursor of aluminate.

In some embodiments, the process may be a continuous flow process.

In some embodiments, the process may be a batch or semi-batch process.

In some embodiments, the layered double hydroxide of step a) may be at least partially spent after capturing the silica from the water stream.

In some embodiments, a portion of the layered double hydroxide may be regenerated in step b) by calcining the layered double hydroxide. The regenerated layered double hydroxide may be reintroduced back into the process in step c) pre or post primary influent stream.

In some embodiments, a portion of the partially spent layered double hydroxide removed from the process may be recycled and reintroduced back into the process in step c) pre or post primary influent stream.

In some embodiments, the process of step c) may further comprise addition of one or more hydroxides to the process, wherein the one or more hydroxides may be selected from the group consisting of i) layered double hydroxide, ii) calcined layered double hydroxide, and iii) layered double hydroxide forming agents such as magnesium hydroxide or a precursor of magnesium hydroxide, and/or a soluble aluminate compound or a precursor of aluminate such as aluminium hydroxide.

In some embodiments, the layered double hydroxide comprises hydrotalcite. The layered double hydroxide may comprise $[M^{(II)}_{1-x}M^{(III)}_x(OH)_2]^{x+}[A]\cdot mH_2O$ where $M^{(II)}$ may be selected from $Mg^{2+}$, $Ca^{2+}$, $Mn^{2+}$, $Fe^{2+}$, $Co^{2+}$, $Ni^{2+}$, and $Zn^{2+}$; $M^{(III)}$ may be selected from $Al^{3+}$, $Cr^{3+}$, $Mn^{3+}$, $Fe^{3+}$, $Co^{3+}$, and $Ga^{3+}$; and A may be selected from $Cl^-$, $Br^-$, $I^-$, $NO_3^-$, $CO_3^{2-}$, $SO_4^{2-}$, and/or organic anions or combinations thereof depending on ion selectivity in the layered double hydroxide.

In some embodiments, the recycling and regeneration step may comprise at least 10 cycles.

In some embodiments, the layered double hydroxide may contain a range of silica forms in addition to other contaminants derived from previous recycling and regeneration.

In one embodiment, the process may further comprise adding (iii) an iron salt or compound to said water.

In some embodiments, the magnesium hydroxide or the precursor of magnesium hydroxide is added to said water before the soluble aluminate compound or precursor of aluminate.

In other embodiments, the soluble aluminate compound or precursor of aluminate is added to said water before the magnesium hydroxide or the precursor of magnesium hydroxide.

In embodiments wherein silica comprises dissolved silica, the one or more binding modes may comprise:
i) surface precipitation on the layered double hydroxide;
ii) complexation with aluminate ions as a proto-aluminosilicate mineral in or associated with the layered double hydroxide; and,
iii) intercalation of silicate anion as an interlayer anion in the lattice of the layered double hydroxide.

In some embodiments, there may be surface precipitation on the face or edge of the layered double hydroxide. It will be appreciated that dissolved silica encompasses polymeric silicates present in the natural or waste water.

In embodiment wherein silica comprises colloidal or particulate silica, the one or more binding modes may comprise:
i) providing a nucleation site for layered double hydroxide formation;
ii) providing a bridge between layered double hydroxide colloids/particles, and
iii) entrainment within the layered double hydroxide colloid/particle or within an layered double hydroxide colloid/particle aggregate.

In one embodiment, the process may further comprise any one or more of the following subsequent steps comprising:
a) wherein the natural or waste water contains $Sr^{2+}$, $Ba^{2+}$ and/or $Ra^{2+}$, adding permanganate to said treated water followed by a reducing agent to produce one or more manganese-containing oxide/hydroxide compounds and to reduce excess permanganate;
b) adding an excess of carbonate to said treated water or to the water produced in step a) to remove dissolved calcium as calcium carbonate solids;
c) adding excess aluminate and adjusting pH to 10-12 with base to said treated water to remove dissolved calcium as one or more Ca- and Al-bearing compounds; and,
d) separating the layered double hydroxide and, optionally, one or more solids from the water treatment stream produced in steps a), b) and/or step c).

In one embodiment, the separation step may be achieved by mechanical and/or chemical means. For example, suitable examples of mechanical separation techniques include, but are not limited to, tangential separation, filtration, dissolved air flotation, centrifugation, or gravity or clarifier separation. Suitable examples of chemical means include, but are not limited to, adding a flocculant and/or a coagulant or a combination thereof to said water treatment stream.

In one embodiment the precursor of magnesium hydroxide may be a Mg-containing precursor compound capable of producing magnesium hydroxide in an alkaline solution, in particular when the natural or waste water has a pH>8. It will be appreciated that the natural or waste water may inherently be pH>8 or that chemical agents may be added to the natural or waste water to increase the pH to >8 so that magnesium hydroxide particles precipitate in situ. Suitable precursor compounds include, but are not limited to, magnesium chloride, magnesium sulphate, magnesium nitrate and magnesium oxide.

In one embodiment the precursor of soluble aluminate ions are alkali metal aluminate salts, aluminium sulphate, aluminium hydroxide or organometallic compounds containing aluminium.

Step b) may comprise maintaining the pH of said stream at pH from 8 to 11 with a pH buffering agent. Examples of suitable pH buffering agents include, but are not limited to sodium carbonate/sodium bicarbonate buffers.

In one embodiment, the layered double hydroxide formed in situ may be recycled and mixed with a further water stream to remove contaminants therefrom. The contaminants may be removed via adsorption, ion-exchange, aggregation or flocculation processes.

In some embodiments, the process may also be utilised to remove various contaminants from natural or waste water. For example, PFAS, PFOS and related contaminants may be removed from natural or waste water by incorporating PFAS, PFOS and related contaminants in the lattice of the layered double hydroxide as an interlayer anion and/or by binding to the layered double hydroxide via one or more binding modes.

In some embodiments, the layered double hydroxide removed from the process at step a) of the regeneration/recycling step, may also contain or otherwise be associated with magnesium hydroxide and a range of contaminants including various forms of silica from the process removing layered double hydroxide.

Alternatively, or additionally, detergents, oils and petroleum hydrocarbons or mixtures thereof are removed from natural or waste water by formation of inorganic-organic complexes with the layered doubly hydroxides formed in situ.

BRIEF DESCRIPTION OF DRAWINGS

Preferred embodiments will now be further described and illustrated, by way of example only, with reference to the accompanying drawings in which.

DESCRIPTION OF EMBODIMENTS

The present disclosure relates to a process for removing silica and reducing total hardness of a natural or waste water containing silica and scale-forming ions.

General Terms

Throughout this specification, unless specifically stated otherwise or the context requires otherwise, reference to a single step, composition of matter, group of steps or group of compositions of matter shall be taken to encompass one and a plurality (i.e. one or more) of those steps, compositions of matter, groups of steps or groups of compositions of matter. Thus, as used herein, the singular forms "a", "an" and "the" include plural aspects unless the context clearly dictates otherwise. For example, reference to "a" includes a single as well as two or more; reference to "an" includes a single as well as two or more; reference to "the" includes a single as well as two or more and so forth.

Each example of the present disclosure described herein is to be applied mutatis mutandis to each and every other example unless specifically stated otherwise. The present disclosure is not to be limited in scope by the specific examples described herein, which are intended for the purpose of exemplification only. Functionally-equivalent products, compositions and methods are clearly within the scope of the disclosure as described herein.

The term "and/or", e.g., "X and/or Y" shall be understood to mean either "X and Y" or "X or Y" and shall be taken to provide explicit support for both meanings or for either meaning.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be clearly understood that, although a number of prior art references are made herein, this reference does not constitute an admission that any of this information forms part of the common general knowledge in the art, in Australia or in any other country.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the present specification, including definitions, will control. In addition, the materials, methods, and examples are illustrative only and not intended to be limiting.

Specific Terms

The term 'silica' as used herein refers broadly to silica present in water. It will be appreciated that dissolved silica may be present in water in several different forms include, but not limited to, ortho-silicic acid, monomeric ortho-silicate anions, polymeric silicate anions, colloidal silica having a particle diameter size in a range of 0.01-1.0 micron and particulate silica having a particle diameter size in a range of 1.0-100 micron. It will be appreciated that particles and colloids may also contain silica associated with other elements in a range of mineral forms.

The expression 'total hardness' as used herein refers to the concentration of calcium and magnesium ions expressed as equivalent of calcium carbonate, as calculated with the following formula:

$$\text{Total Hardness (mg/L } CaCO_3 \text{ equivalent)} = 2.5*Ca^{2+} \text{ (mg/L)} + 4.1*Mg^{2+} \text{ (mg/L)}$$

The expression 'scale-forming ions' as used herein refers to divalent alkaline earth cations found in hard water and capable of producing water-insoluble mineral salts or scale when bonded or otherwise associated with negatively charged anions on surfaces in contact with hard water. Exemplary scale-forming ions include, but are not limited to, $Ca^{2+}$, $Mg^{2+}$ and $Ba^{2+}$. Other scale-forming ions may also include, but are not limited to, transition metals such as $Fe^{2+}/Fe^{3+}$ and $Mn^{2+}/Mn^{4+}$.

The reference to 'natural or waste water' or 'waters' will be used to refer to any water containing silica and scale-forming ions. Exemplary waters include, but are not limited to, surface water, groundwater, produced water, municipal water, process water, stormwater, waste water derived from industrial processing, agricultural processing, mineral processing, mine pit waters, ore overburden or waste rock seepage or drainage waters, concentrate streams from desalination plants, ion-exchange waters, boiler waters, oilfield waters and so forth.

The term 'hydrotalcite' (HT) as used herein refers to a common form of layered double hydroxides (LDH) comprising $Mg^{2+}$ and $Al^{3+}$ as the predominant cations. LDH is a class of both naturally occurring and synthetically produced materials characterised by a positively-charged mixed metal hydroxide layers separated by interlayers that contain water molecules and a variety of exchangeable anions. LDH is most commonly formed by the co-precipitation of divalent (e.g. $Mg^{2+}$, $Fe^{2+}$) and trivalent (e.g. $Al^{3+}$, $Fe^{3+}$) metal cation solutions at moderate to high pH.

A hydrotalcite may be represented by the general formula (1):

$$Mg_{(1-x)}^{2+} Al_x^{3+} (OH)_2 A^{n-}{}_y H_2O \qquad (1)$$

where $A^{n-}$ is the interlayer anion of valence n. The x value represents the proportion of trivalent metal ion to the proportion of total amount metal ion and y denotes variable amounts of interlayer water. It will be appreciated that other divalent and trivalent metal cations may substitute for $Mg^{2+}$ and $Al^{3+}$, respectively, depending on their relative concentrations in solution. Accordingly, there will be variation in the composition of the hydrotalcite as a reflection of the method of formation and solution chemistry and any additives or changes in physico-chemical conditions from which the hydrotalcite has been produced.

Within the LDH or HT structure there are octahedral metal hydroxide sheets that carry a net positive charge due to limited substitution of trivalent for divalent cations as described above. As a consequence, it is possible to substitute a wide range of inorganic or organic anions into the LDH or HT structure. These anions are often referred to as "interlayer anions" as they fit between the layers of hydroxide material.

The term 'manganese-containing oxide/hydroxide compound' as used herein refers to a group of amorphous manganese oxides, in particular psilomelane, having a generalised formula represented as $M(Mn^{2+})(Mn^{4+})_8O_{16}(OH)_4$ or $(M,H_2O)_2Mn_5O_{10}$, wherein M may be, Ba, Sr and/or Ra.

Process for Removing Silica and Reducing Total Hardness

The disclosure provides a process for removing silica and reducing total hardness of a natural or waste water containing silica and scale-forming ions.

The process involves adding (i) magnesium hydroxide or a precursor of magnesium hydroxide and (ii) a soluble aluminate compound or a precursor of aluminate to said water while maintaining pH>8 to produce hydrotalcite in situ.

The inventor has discovered, counterintuitively, that increasing the concentration of magnesium in hard water by adding magnesium hydroxide or a precursor of magnesium hydroxide has a net 'softening' effect because scale-forming ions, such as magnesium, are incorporated into a lattice of the layered double hydroxide as it forms in situ. A resultant decrease in magnesium ions in solution is a major factor in reducing hardness and ionic strength in the treated natural or waste water, in particular because total hardness in water is more than 1.6 times as dependent on the concentration of magnesium in solution (4.1 factor) than the concentration of calcium in solution (2.5 factor) according to the equation for calculating total hardness (i.e. Total Hardness (mg/L $CaCO_3$ equivalent)=4.1*$Mg^{2+}$ (mg/L)+2.5*$Ca^{2+}$ (mg/L)).

Magnesium hydroxide may be added to said water as a solid particulate or as a slurry or suspension. Magnesium hydroxide particles in suspension behave as nucleation sites for formation and growth of layered double hydroxide particles in the presence of aluminate in solution. The formation of layered double hydroxide on a $Mg(OH)_2$ particle may occur via epitaxial growth, in particular by formation of a partial or a complete epitaxial layer, coating or film of layered double hydroxide on the $Mg(OH)_2$ particle. It will be appreciated that a proto-layered double hydroxide or related precursor phase of layered double hydroxide may be concurrently formed on the magnesium hydroxide particles. The composition and degree of crystallinity of the proto-layered double hydroxide, related precursor phase of layered double hydroxide or the layered double hydroxide itself may vary over time pursuant to the prevailing physico-chemical conditions and solution composition of the natural or waste water.

The precursor of magnesium hydroxide may be a Mg-containing precursor compound capable of producing magnesium hydroxide in an alkaline solution. Suitable precursor compounds include, but are not limited to, magnesium peroxide, magnesium chloride, magnesium sulphate, magnesium nitrate and magnesium oxide. The Mg-containing precursor compound may be added to said water, in particular when said water is alkaline, as a solid particulate or as a solution, thereby precipitating magnesium hydroxide particles in situ. Magnesium peroxide spontaneously reacts in water to form magnesium hydroxide and hydrogen peroxide, thereby serving a dual purpose as both a precursor of magnesium hydroxide for layered double hydroxide formation in situ and a reducing agent to reduce permanganates or otherwise any reactive inorganics and/or organics.

Alternatively, the precursor of magnesium hydroxide may be dissolved magnesium already present in the natural or waste water whereby magnesium hydroxide is generated in situ when pH>9.

The soluble aluminate compounds may be alkali metal aluminate salts such as sodium aluminate, sodium alumina, aluminium hydroxide, and so forth. The soluble aluminate compounds may be added to said water as a solid particulate or as a solution.

The precursor of aluminate ions may be any aluminium-containing compound capable of producing aluminate ions in alkaline solution, in particular pH>8. Suitable examples of such aluminium-containing compounds include, but are not limited to, aluminium sulphate, aluminium nitrate, aluminium chloride, labile aluminium coordination complexes, or organometallic compounds containing aluminium. The aluminium-containing compound may be added to said water, in particular when said water is alkaline, as a solid particulate or as a solution, thereby forming aluminate ions in situ.

In some embodiments, the magnesium hydroxide or the precursor of magnesium hydroxide may be added to said water before the soluble aluminate compound or precursor of aluminate.

In other embodiments, the soluble aluminate compound or precursor of aluminate may be added to said water before the magnesium hydroxide or the precursor of magnesium hydroxide.

In particularly hard waste water where there is a high Ca concentration, additional aluminium, preferably as an aluminate salt, may be added during or subsequent to the formation of the layered double hydroxide as described above. In this particular embodiment, aluminate may be added together with base (e.g. NaOH) to achieve a final pH of between 10 and 12, resulting in formation of one or more mixed Ca- and Al-bearing precipitates including hydrocalumite, ettringite as layered double hydroxide Ca-rich analogues of layered double hydroxide, calcium aluminate hydrate or tricalcium aluminate and other alkaline earth mineralogical or compositional analogues. Such mixed Ca- and Al-bearing precipitates may co-precipitate or form a solid-solution series with layered double hydroxide to form a mixed heterogeneous Mg—Ca—Al or in the presence of silica, a mixed heterogeneous Mg—Ca—Al—Si precipitate.

The inventors have also found that Fe may be optionally added to said water in the form of a soluble Fe salt or as a particulate or colloidal Fe compound, such as ferrihydrite, goethite or other iron oxide, hydroxide or oxyhydroxide forms. Such compounds may be amorphous or crystalline. The addition of Fe, particularly as a soluble salt may advantageously form (i) a substrate for layered double hydroxide formation, (ii) once layered double hydroxide is formed act as a scavenger for residual soluble Al, and (iii) also have a serendipitous effect on flocculation of the layered double hydroxide by acting as a bridge between layered double hydroxide crystals or crystal aggregates.

In addition to reduction of soluble Mg, there may also be simultaneous removal of silica via incorporation in the lattice of the layered double hydroxide as an interlayer anion and/or by binding to the layered double hydroxide via one or more binding modes. The one or more binding modes by which silica is bound to the layered double hydroxide will be dependent on whether silica is present in solution as dissolved silica including polymeric silica or as colloidal or particulate silica. This in turn, is strongly dependent on the initial solution pH, composition and physico-chemical conditions of said water.

For example, when silica comprises dissolved silica, it may be present in said water as ortho-silicate or polymeric silicate anions (i.e. polymeric silica). These anions may bind to layered double hydroxide by surface precipitation or by complexation with aluminate ions to form a proto-aluminosilicate mineral in or associated with the layered double hydroxide. Surface precipitation may occur on the face or edge of the layered double hydroxide. Alternatively, silicate anions may be incorporated in the lattice of the layered double hydroxide as an interlayer anion.

Alternatively, when silica is present in said water as colloidal or particulate silica, the colloidal or particulate silica may function as nucleation sites for formation and growth of layered double hydroxide particles, forming bridges between layered double hydroxide colloids/particles, or entrainment within the layered double hydroxide colloid/particle or within an layered double hydroxide colloid/particle aggregate, aiding in agglomeration of the layered double hydroxide so formed in the treated water.

Advantageously, in comparison to other processes for removal of silica from natural or waste water, if silica is present in said water in two or more forms described above, there are several binding modes by which the silica, regardless of its form, may be effectively removed from the treated water by incorporation into or binding with layered double hydroxide as it forms in situ. Other methods to remove silica from natural or waste water rely on several independent single mechanisms such as adsorption by adsorbents or precipitation via interaction, for example, with magnesium oxide, thereby necessitating multi-step processes for removal of silica from natural or waste water.

Moreover, the process as described herein provides for simultaneous removal of magnesium, silica, particulates and colloids from natural and waste water, rather than stepwise removal of these contaminants which require additional reagents and separation steps. Consequently, the process is inherently simple to operate, particularly because a continuous stream of natural water or waste water may be treated according to the process as described herein, for example by sequential injection of reagents into the stream, without having to take a stream offline for separate treatment(s) (which have additional capital and operational costs associated therewith) to remove one or more of these contaminants.

Furthermore, the process as described herein may be performed without the need for one or more pretreatment steps to reduce the Si concentration in said water.

In various embodiments, the natural or waste water may be at a pH of between 8.0 and 11 to both facilitate formation of layered double hydroxide in situ and enhance stability thereof. In particular, too low a pH may lead to partial dissolution of Mg and then Al, whereas at pH>11 there is likely to also be partial Al dissolution. Although partial Mg and Al dissolution will decrease the amount of layered double hydroxide formed in situ, the presence of unstable, reactive layered double hydroxide solids in suspension will also have a detrimental effect on settling or separation processes downstream.

The pH of the natural or waste water may be adjusted to pH>8, in particular to a pH in a range of 8 to 11 by addition of sodium hydroxide or similar hydroxide salts. Indeed, the pH of the natural or waste water may inherently be in a pH range of 8 to 11 or by virtue of addition of magnesium hydroxide, precursors of magnesium hydroxide, soluble aluminate compounds and/or precursors of aluminate ions. Nevertheless, in some embodiments buffering agents may be added to the natural or waste water (as solids, a solution, or suspension) to maintain the pH in the range of 8 to 11. Suitable pH buffering agents include one or more water soluble compounds capable of maintaining the natural or waste water at a pH in a range of 8 to 11. Exemplary pH buffering agents include, but are not limited to a bicarbonate/carbonate buffer such as a mixture of sodium bicarbonate and sodium carbonate.

These carbonate buffers also have an additional function in the process described herein of not only maintaining an optimal pH for layered double hydroxide mineral to form in situ but also to remove dissolved Ca and thereby further softening the natural or waste water.

Therefore, the unexpected combinatorial advantages of using a bicarbonate/carbonate buffer is that in addition to in situ formation and precipitation of layered double hydroxide, there is reduction of calcium ions in solution (i.e. a further reduction in water hardness) due to in situ calcium carbonate precipitation. Moreover, the concentration of suspended solids (layered double hydroxide and calcium carbonate) in the treated water is increased, resulting in enhanced overall settling downstream and, concomitantly, enhanced solute recovery.

It will be appreciated that natural or waste water may contain other bivalent or trivalent metal cations and/or various polyatomic anions in solution, some of which are also scale-forming (e.g. Fe and Mn) which fortuitously may also be incorporated in the lattice of the layered double hydroxide or as an interlayer anion as layered double hydroxide forms in situ. Alternatively, iron and manganese hydroxides or oxides present in the natural or waste water may be removed therefrom by adsorption or physical entrainment within the layered double hydroxide particle or layered double hydroxide colloid/particle agglomerate during in situ formation of layered double hydroxide. Furthermore, other particulate or colloidal species other than silica in the natural or waste water may comprise nucleation sites and/or bridging nodes for layered double hydroxide particles.

Moreover, some organic contaminants such as per- and poly-fluoroalkyl substances (PFAS) and related moieties such as perfluorooctanesulfonate (PFOS) and perfluorooctanoic acid (PFOA) may also be removed from waste water by employing the process as described herein because such organic contaminants have a strong affinity for layered double hydroxides formed in situ, in particular because PFAS are anionic in the pH range where layered double hydroxide formation occurs. Some of the modes in which PFAS may be removed include, but are not limited to, electrostatic binding to magnesium hydroxide particles when used as a substrate for layered double hydroxide formation, incorporation within the interlayers of the layered double hydroxide as an interlayer anion, attachment or binding to the edges of the layered double hydroxide particle. Alternatively, PFAS and related moieties may associate with other organic compounds such as sodium dodecyl sulphate (SDS) which may be added as part of the water treatment process. Incorporation of SDS in the interlayer may facilitate intercalation of PFAS and related moieties into the interlayer of the double layer hydroxide during layered double hydroxide formation.

Notwithstanding the above description, the process as described herein may further comprise any one or more subsequent steps to reduce the concentration of divalent metal cations which either directly contribute to water hardness or which are considered as contaminants or desirable to separate.

In embodiments wherein the natural or waste water contains $Sr^{2+}$, $Ba^{2+}$ and/or $Ra^{2+}$, one subsequent step comprises adding permanganate to said treated water followed by a reducing agent to produce one or more manganese-containing oxide/hydroxide compounds and to reduce excess permanganate. Permanganate is most conveniently added in the form of a soluble permanganate salt, such as potassium permanganate. It will be appreciated that in some solution compositions there may be incorporation of permanganate as an interlayer anion in the layered double hydroxide produced in situ.

The reducing agent may be any chemical compound capable of reducing permanganate to the one or more manganese-containing oxide/hydroxide compounds, in particular psilomelane and manganese dioxide. Suitable reducing agents may include, but are not limited to, hydrogen peroxide, peroxide salts in particular magnesium peroxide or calcium peroxide, ascorbic acid and/or ascorbate salts. It will be appreciated that a reducing agent such as hydrogen peroxide may be either added directly to the natural or waste water or formed in situ by reaction of magnesium peroxide with the natural or waste water.

Where excess hydrogen peroxide is produced from the reaction of peroxide salts with water, regardless of the permanganate concentration, the hydrogen peroxide which is generated in situ may advantageously serve as an oxidant for other inorganic and/or organic compounds present in the natural or waste water to reduce biological or chemical oxygen demand.

In addition to the bicarbonate/carbonate buffer utilised to maintain the pH of said treated water in a range of 8 to 11, the process may further comprise subsequently adding an excess of carbonate to said treated water or to the water treated with permanganate and a reducing agent to remove dissolved calcium as calcium carbonate solids. The excess of carbonate may be conveniently added as a solid or as a solution of an alkali carbonate salt such as sodium carbonate, potassium carbonate or lithium carbonate.

The process may further comprise separating the layered double hydroxide and, optionally, one or more solids from preceding water treatment steps, such as calcium carbonate and the one or more manganese-containing oxide/hydroxide compounds in particular psilomelane and manganese dioxide.

The addition of other reagents required to, or in addition to those required to, form layered double hydroxide provide notable advantages to the water treatment process as described herein, not only because they contribute to precipitation and removal of target ions of interest, but also because they assist in the co-precipitation and more effective settling and hence separation of solids from solution. In particular, the densities of magnesium hydroxide and layered double hydroxide are approximately 2.3 $g/cm^3$ and 2.0 $g/cm^3$, respectively. It will be appreciated that, given their relatively high densities, the combination of magnesium hydroxide and layered double hydroxide formed in situ will facilitate enhanced settling of particles and colloids from the natural or waste water treated according to the process described herein.

Separating the layered double hydroxide and, optionally, one or more solids may be achieved by mechanical and/or chemical means. For example, suitable examples of mechanical separation techniques include, but are not limited to, tangential separation, filtration, dissolved air flotation, centrifugation, or clarifier or gravity separation.

Suitable examples of chemical means include, but are not limited to, adding a flocculant and/or a coagulant to said water treatment stream. Flocculants derived from natural or modified natural materials including, but not limited to, polyglutamic acid, gamma polyglutamic acid, carrageenan, egg white protein, cationic modified starches and isinglass have all been demonstrated both singly and in combination, optionally in combination with synthetic flocculants, to be effective in the flocculation and settling of layered double hydroxides in the method as described herein.

The process as described herein may be performed in a batch mode, continuous batch mode or a pump and treat (continuous) mode. The magnesium hydroxide (or the precursor of magnesium hydroxide), the soluble aluminate compound (or the precursor of aluminate) and the buffering agent(s) may be added to the natural or waste water sequentially with respect to one another or simultaneously as separate feed streams.

In one particular embodiment, magnesium hydroxide (or the precursor of magnesium hydroxide) is added to the natural or waste water before the soluble aluminate compound (or the precursor of aluminate), followed by a solution of the buffering agent if the soluble aluminate compound (or the precursor of aluminate) are not provided in a buffered alkaline solution. The magnesium hydroxide (or the precursor of magnesium hydroxide), the soluble aluminate compound (or the precursor of aluminate) and the pH buffering agents may be collectively referred to herein as "the layered double hydroxide reagents". This sequence of addition ensures that magnesium-containing and aluminium-containing moieties suitable for forming layered double hydroxide in situ are already present in solution prior to increasing the pH to >8. In some embodiments, the pH buffering agents may be subsequently added if required.

In batch or continuous batch modes, one or more of the layered double hydroxide reagents may be continuously or intermittently added to the natural or waste water so as to maintain an appropriate solute composition for layered double hydroxide formation in situ. The sequential (or simultaneous) additions of the layered double hydroxide reagents may also occur in continuous batch mode within a clarifier or similar apparatus which is configured to provide for settling and removal of settled layered double hydroxide while layered double hydroxide and, optionally, one or both of calcium carbonate or the one or more manganese-containing oxide/hydroxide compounds are formed in situ in the clarifier.

In the pump and treat mode, the layered double hydroxide reagents may be sequentially added into a flowing stream of natural or waste water. Where in-pipe mixing is insufficient to achieve a homogenous distribution of layered double hydroxide reagents, baffles, tanks or vortex mixers may be used to ensure effective mixing, preferably prior to adding the subsequent layered double hydroxide reagent. Sufficient residence time for the layered double hydroxide reagents for layered double hydroxide formation in situ and other subsequent steps where there is formation of solids such as manganese-containing oxide/hydroxide compounds (in particular psilomelane and manganese dioxide) and/or calcium carbonate, may also be facilitated by several conventional techniques which are well understood by those skilled in the art. Such conventional techniques include, but are not limited to, increasing a path length of the natural and waste water by adding more pipe, in static or stirred reactors, decreasing the flow rate, increasing the volume of overflow vessels or other means as required.

In a further embodiment, two or more parallel streams of natural or waste water may be augmented with one or more layered double hydroxide reagents in an amount sufficient to form layered double hydroxide in situ when the two or more parallel streams are subsequently combined in a sequence selected to optimise the water treatment process.

The process as described herein provides for in situ formation of layered double hydroxide which simultaneously removes scale-forming ions, in particular Mg, and silica by a variety of binding modes, resulting in an effective process for softening via a reduction in Mg and Ca. In some embodiments, the binding modes may include a variety of mechanisms such as, for example, ion-exchange, adsorption and co-precipitation, optimally, and ideally, all of which may be occurring simultaneously.

In an example, silica removal may be achieved via the in situ formation of layered double hydroxide, where four separate reaction mechanisms come into play and occur in a defined order following the sequential addition of the reagents. Specifically,
1) following addition of $Mg(OH)_2$, or a precursor of magnesium hydroxide, surface complexation of one or more of colloidal, polymeric or monomeric forms of silica;
2) following addition of a soluble aluminate compound or a precursor of aluminate, the formation of aluminosilicate moieties with subsequent incorporation in layered double hydroxide as an interlayer anion or later removed via aggregation/flocculation with the layered double hydroxide;
3) following addition of sodium hydroxide, layered double hydroxide self-assembly from added reagents and/or $Mg^{2+}$ and $Ca^{2+}$ cations in the waste water or epitaxial growth on magnesium hydroxide particles. During layered double hydroxide self-assembly, polymeric and monomeric silica may also be incorporated as interlayer anions and via ligand complexation of layered double hydroxide particle edges; and
4) removal of colloidal silica and aluminosilicate moieties via nucleation and/or co-precipitation within the layered double hydroxide particle or aggregate as it forms in suite.

Advantageously, both magnesium and calcium incorporation into the layered double hydroxide may occur directly from solution leading to a net reduction in total hardness of the waste water. The combined effect of the removal of a variety of forms of silica and magnesium and calcium, leading to a net reduction in total hardness, confers major advantages over existing technologies, particularly those such as membrane separation technologies such as reverse osmosis where low silica and hardness lead to reduced fouling and substantial performance improvement.

Beneficially, it has also been found that the layered double hydroxide formed in situ is particularly reactive in the short term, typically hours to days, and may also be recycled and mixed with contaminants contained in new waste water streams often with few, or minimal addition reagents added, to further remove the said contaminants via adsorption or ion-exchange processes. The importance of this process is that it allows for a productive secondary or multiple use of the layered double hydroxide formed in situ, thus maximising the value of reagents added to facilitate its initial in situ formation.

Additionally, the process may also remove other alkaline earths by a permanganate reduction step, particulate and colloidal material, as well as natural organic matter and organic contaminants, further simplifying the treatment process for natural and waste waters.

In addition, it has been noted that in the treatment of contaminated waters, primarily for silica removal and hardness reduction that advantageously, in situ layered double hydroxide formation may facilitate removal of organic contaminants including detergents, oils and petroleum hydrocarbons or mixtures thereof, via the formation of inorganic-organic complexes.

Consequently, the reduced number of steps required in the process means that, in comparison to prior art processes, many items of conventional water treatment equipment and additional treatment steps may not be required to treat often complex contaminant mixtures. Therefore it will be appreciated that the process as described herein provides a vastly simplified, broad spectrum treatment process for treatment of natural or waste waters.

The simultaneous benefits derived from the precise selection of precursor/starting materials for layered double hydroxide synthesis, their order of addition and the suite of complimentary reactions described above, and in particular the formation of layered double hydroxide in situ, act as a substantial performance multiplier over existing (waste) water treatment methods which are used to address the same problem.

Of note is the capacity to simultaneously remove a range of silica forms (for example, monomeric, polymeric, colloidal and particulate) via a variety of mechanisms such as ion-exchange, surface adsorption and co-precipitation, and to reduce total hardness in addition to the removal of a range of other contaminants via the above mechanisms. This process may be augmented by calcination and recycling/regeneration steps allowing for enhanced and repeated removal of silica and total hardness, hitherto unknown, to facilitate major process advantages in terms of increased solute recovery and cost reductions compared to existing technologies.

Figure 1:
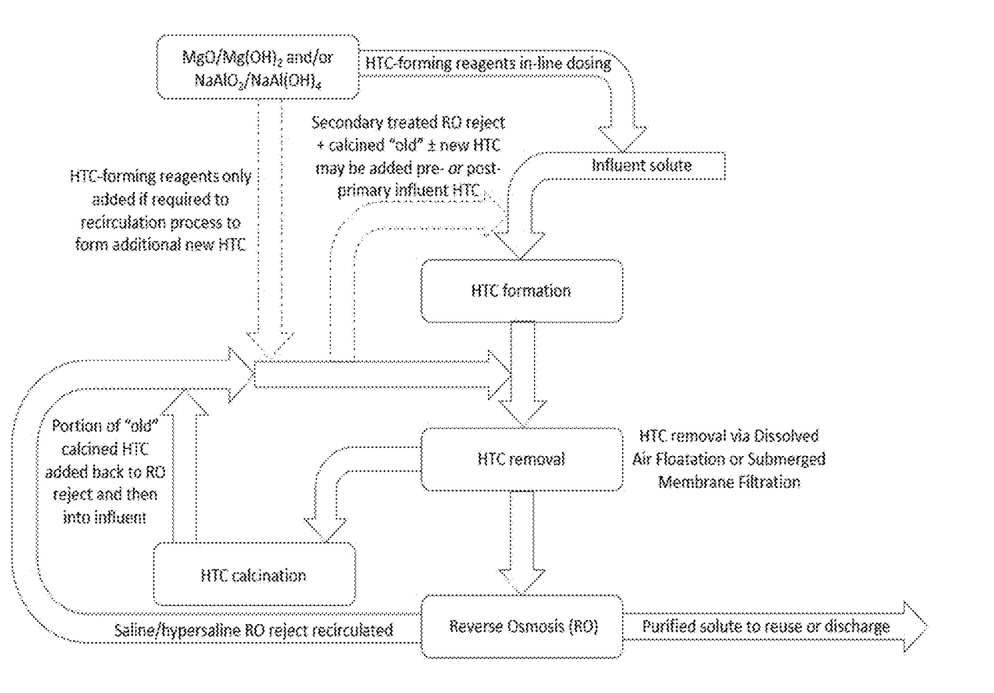
FIG. 1 is a representative flow sheet of one embodiment of the process for removing silica and reducing total hardness of a natural or waste water containing silica and scale-forming ions when layered double hydroxide is recovered and recycled (regenerated). With modification where necessary, this flow sheet may describe a continuous flow, batch or semi-batch process.

Further advantages may arise when the layered double hydroxide (hydrotalcite or HT or HTC) is separated/removed from the process and a portion of the removed layered double hydroxide is regenerated and/or recycled (see FIG. 1). In an embodiment, the process, as defined herein, may further comprise a recycling and regeneration step and/or a hydroxide addition step. In some embodiments, the recycling and regeneration step may comprise: a) removing layered double hydroxide from the process; b) regenerating and/or recycling at least a portion of the layered double hydroxide removed from the process to form regenerated layered double hydroxide; and c) reintroducing the regenerated and/or recycled layered double hydroxide back into the process. In some embodiments, the hydroxide addition step may comprise addition of one or more hydroxides to the continuous flow process, wherein the one or more hydroxides may be selected from the group consisting of i) layered double hydroxide, ii) calcined layered double hydroxide, and iii) layered double hydroxide forming agents such as magnesium hydroxide or a precursor of magnesium hydroxide, and/or a soluble aluminate compound or a precursor of aluminate.

In some embodiments, the layered double hydroxide of step a) may be at least partially spent after capturing the silica from the water stream.

In some embodiments, the layered double hydroxide of step a) may be at least partially spent after capturing the silica from the water stream and regenerated.

In some embodiments, the layered double hydroxide of step a) may be at least partially spent after capturing the silica from the water stream and regenerated, and the calcined material may permanently or irreversibly bind or immobilise the silica and other contaminants in new minerals other than the layered double hydroxide.

A portion of the at least partially spent layered double hydroxide removed from the process in step a) may be either recycled and reintroduced back into the process, or regenerated to form regenerated layered double hydroxide and reintroduced back into the process. In some embodiments, a portion of the partially spent layered double hydroxide removed from the process may be regenerated in step b) by calcining the layered double hydroxide removed from the process in step a). The regenerated layered double hydroxide may be reintroduced back into the process in step c) pre or post primary influent stream. In some embodiments, a portion of the partially spent layered double hydroxide removed from the process may be recycled and reintroduced back into the process in step c) pre or post primary influent stream. The term recycled as used herein refers to partially spent layered double hydroxide that has been removed from the process in step a) and reintroduced back into the process in step c) pre or post primary influent stream.

In some embodiments, the process of step c) may further comprise addition of one or more hydroxides to the process, wherein the one or more hydroxides may be selected from the group consisting of i) layered double hydroxide, ii) calcined layered double hydroxide, and iii) layered double hydroxide forming agents such as magnesium hydroxide or a precursor of magnesium hydroxide, and/or a soluble aluminate compound or a precursor of aluminate.

It will be appreciated that these additions of layered double hydroxide and other additional compounds may have a number of further advantageous outcomes, these may include one or more of the following:
- to act as a nucleus for subsequent layered double hydroxide formation to increase the particle size/aggregation of the layered double hydroxide structure, and with that, ease of recovery, particularly by Dissolved Air Floatation (DAF), but also other methods (centrifuge, membrane) reliant on particle or aggregate size and/or density;
- to act as an additional cation/anion exchanger, with an emphasis in particular on enhanced Ca removal, particularly if a portion or all of the layered double hydroxide is calcined (e.g. rotary kiln or solar thermal oven) within a defined temperature/range wherein the layered double hydroxide, once introduced back into the influent, will spontaneously rehydrate/reform via a memory/regenerative effect;
- the rehydration/regenerative process of the calcined layered double hydroxide may lead to the formation of net hydroxide alkalinity via the reactions:

these reactions may then consume Ca and/or Mg as hydroxide precipitates via the reactions within a locally high pH environment associated with the surface of the rehydrating layered double hydroxide:

Alternatively, there may be binary exchange (via isomorphous substitution) of Ca and/or Mg with the rehydrating layered double hydroxide via the reactions:

It will be understood that the amount of hydroxyl generation and therefore the extent of Ca or Mg removal will vary according to the stoichiometry of the calcined layered double hydroxide. The calcined layered double hydroxide, whether prepared from recycled layered double hydroxide or from new, can rehydrate and incorporate anions in order to rebuild the layered double hydroxide structure. In some embodiments, a high efficiency of at least 80, 85, 90, 95, 99, 99.5, or 99.9% removal of a variety of forms of silica, and 50, 55, 60, 65, 70 and 75% removal of magnesium and calcium as a proportion of total hardness, may be achieved using calcined layered double hydroxide.

Typically, adsorbents for silica removal require high dosages to achieve a high efficiency (at least 80-90% removal). Calcined layered double hydroxides constitute a solution as they can be regenerated from partially spent layered double hydroxides and the required dosage for high silica removal efficiencies may be provided in a range of between about 1 g/L and about 10 g/L, preferably about 2 g/L and about 5 g/L. The required dosage of calcined layered double hydroxide may be less than about 10, 9, 8, 7, 6, 5, 4, 3, 2, or 1 g/L. The required dosage of calcined layered double hydroxide may at least about 1, 2, 3, 4, 5, 6, 7, 8, 9, or 10 g/L. The required dosage of calcined layered double hydroxide may be provided in a range between any two of these previously described upper and/or lower values.

The combined effect of the removal of a variety of forms of silica and magnesium and calcium, leading to a net reduction in total hardness, may confer major advantages over existing technologies, particularly those such as membrane separation technologies, for example, reverse osmosis where low silica and hardness lead to reduced fouling and substantial performance improvement. Particular advantages may be seen in either influent or reject from Reverse Osmosis (RO) (see FIG. 1) or Forward Osmosis (both RO or FO produced in real time or stored), or other brines (for instance in evaporation ponds). In an example, the brines by virtue of their formation will contain substantially increased forms of silica and also Total Hardness (defined from Ca+Mg concentrations), but also of other alkaline earth cations such as Sr and Ba which are known to cause scaling in RO systems. Serendipitously, the high Total Hardness and other alkaline earth cations, due to their high concentrations in reject or evaporation brines, may undergo other parallel reactions when for instance an Al-containing compound is added, with pH adjustment as required, including the formation of tricalcium aluminate or other Ca/alkaline earth- and Al-bearing compounds via addition of for instance NaAlO$_2$/NaAl(OH)$_4$. Collectively, the formation of layered double hydroxides and these parallel reactions may facilitate a further reduction in Total Hardness and other alkaline earths.

Formation of Ca—Al, and other alkaline earth-Al compounds may be particularly advantageous in saline to hypersaline brines or RO reject solutes where the concentrations of alkaline earth elements are often very high, typically, about 100 to 500 mg/L or more depending on the element.

It is understood that temperature, stoichiometry, pH, competing ions and time will all be influential in the performance in terms of silica removal or Total Hardness reduction after the further addition of regenerated layered double hydroxide, recycled layered double hydroxide, (new) layered double hydroxide, calcined (new) layered double hydroxide, or layered double hydroxide forming agents such as MgO/Mg(OH)$_2$ and/or NaAlO$_2$/NaAl(OH)$_4$.

As described herein, hydrotalcites are layered double-hydroxides with the general formula [M$^{(II)}_{1-x}$M(III)$_x$(OH)$_2$]$^{x+}$[A]·mH$_2$O where in some embodiments M$^{(II)}$ may be selected from Mg$^{2+}$, Ca$^{2+}$, Mn$^{2+}$, Fe$^{2+}$, Co$^{2+}$, Ni$^{2+}$, and Zn$^{2+}$; M$^{(III)}$ may be selected from Al$^{3+}$, Cr$^{3+}$, Mn$^{3+}$, Fe$^{3+}$, Co$^{3+}$, and Ga$^{3+}$; and A may be selected from Cl$^-$, Br$^-$, I$^-$, NO$_3^-$, CO$_3^{2-}$, SO$_4^{2-}$, and/or organic anions. In an example, the hydrotalcite form layered double hydroxide may be Mg$_6$Al$_2$(OH)$_{16}$Cl$_2$ but it is understood that cation ratios, anion ratios and final composition may vary substantially and may be specifically tuned for the most advantageous operational outcome by the addition of one or more reagents.

Calcination temperatures, duration and composition of the hydrotalcite may also be varied to further improve process outcomes. The calcination temperature range for the formation of calcined hydrotalcite from hydrotalcite may be typically in the range of about 250 to about 850° C. The calcination temperature may be at least about 250, 300, 350, 400, 450, 500, 550, 600, 650, 700, 750, 800, or 850° C. The calcination temperature may be less than about 850, 700, 650, 600, 550, 500, 450, 400, 350, 300, or 250° C. Combinations of these calcination temperatures and duration are also possible, for example between about 400° C. to about 800° C., about 450° C. to about 750° C., or about 500° C. to about 700° C., from 1 min to 60 min to form calcined hydrotalcite (recycled or new). It will be appreciated that other temperatures are envisaged, provided the calcination temperature is effective for the formation of calcined hydrotalcite. Crucially, at higher calcination temperatures, typically above 600° C. and for longer periods, typically 10 minutes or longer, the calcined hydrotalcite may transform into new secondary minerals including spinel and calcined magnesia, but where silica is present, as for instance removed from the wastewater initially or in one or more recycling steps, other minerals may also form depending on the quantity and mineralogical form of silica relative to other elements present in the layered double hydroxide.

As according to some embodiments as described herein, the layered double hydroxide may be heated to the calcination temperature at a rate of about 10° C./minute to about 250° C./minute, about 10° C./minute to about 50° C./minute, about 50° C./minute to about 100° C./minute, or about 100° C./minute to about 250° C./minute. The layered double hydroxide may be heated to the calcination temperature at a rate of less than about 250° C./minute, less than about 200° C./minute, less than about 150° C./minute, less than about 100° C./minute, less than about 50° C./minute, less than about 40° C./minute, less than about 30° C./minute, less than about 20° C./minute, or less than about 10° C./minute. The layered double hydroxide may be heated to the temperature at a rate of at least about 10° C./minutes, at least about 20° C./minutes, at least about 30° C./minutes, at least about 40° C./minutes, at least about 50° C./minutes, at least about 100° C./minutes, at least about 150° C./minutes, at least about 200° C./minutes, or at least about 250° C./minutes. The layered double hydroxide may be heated to the calcination temperature at a rate that may be provided in a range between any two of these previously described upper and/or lower values.

At least according to some embodiments as described herein, the layered double hydroxide may be maintained at the calcination temperature for about 1 minute to about 60 minutes to provide the calcined layered double hydroxide or other products depending on one or more of duration, temperature and composition. It is understood that interplay between temperature, time, and composition will influence particle size, and mineralogy, and as a result will influence the performance of the calcined layered double hydroxide and derivative forms.

It will be understood that a portion of the at least partially spent layered double hydroxide can be recovered from the process (step a) and regenerated (step b) under similar conditions described above in order to provide recycled calcined layered double hydroxide, also referred to as regenerated layered double hydroxide. The formation of calcined layered double hydroxide may be provided by calcining (new) layered double hydroxide ex-situ.

It will be appreciated that the process described herein is a circularity process (i.e. multiple use of the recycled or calcined layered double hydroxide) providing an operational, cost and performance advantage. In some embodiments, the process may be a continuous flow process. In some other embodiments, the process may be a batch or semi-batch process.

The process described herein may allow for the regeneration of crystalline layered double hydroxide after each subsequent calcination for the silica removal process. The layered double hydroxide after each subsequent calcination was used again for the removal of silica from the natural or waste water stream. Regeneration cycling of the layered double hydroxide involves cycles of calcination and reconstruction. In some embodiments, the recycling and regeneration step may comprise at least 1, 2, 3, 4, 5, 6, 7, 8, 9, or 10 cycles. The recycling and regeneration step may comprise less than 10, 9, 8, 7, 6, 5, 4, 3, 2, or 1 cycles. The number of cycled provided by the recycling and regeneration step may be provided in a range between any two of these previously described upper and/or lower values.

It is also understood that the regeneration of the at least partially spent layered double hydroxide recovered may induce the formation of other compounds, such as, but not restricted to Mg-silicates such as Antigorite Mg$_3$Si$_2$O$_5$(OH)$_4$ or pyroxene or olivine forsterite Mg$_2$SiO$_4$ or Enstatite MgSiO$_3$ or mineralogical analogues/polymorphs thereof. This may provide further advantages in limiting the solubility of previously captured silica in the subsequent application of the regenerated layered double hydroxide.

It is understood that the composition and mineralogy of the layered double hydroxide or any secondary or derivative minerals will be a reflection of the number of recycling steps, if any, accumulated elements via ion-exchange, adsorption or co-precipitation mechanisms, addition of other reagents, and the temperature and duration of any calcination steps. The tailoring of this combination of composition, mineralogy and calcination allows for the manipulation of a range of positive outcomes both in use in the process but also in subsequent applications or disposal.

Regenerated layered double hydroxide may have a multiplicity of advantageous outcomes, for example, removing additional silica forms, increasing pH to remove additional Total Hardness, nuclei for formation of layered double hydroxide via epitaxial growth, dense element of a layered double hydroxide aggregate, or combinations thereof.

Silica and Total Hardness reduction may be also controlled by further addition of one or more of i) layered double hydroxide, ii) calcined layered double hydroxide, and iii) layered double hydroxide forming agents such as magnesium hydroxide or a precursor of magnesium hydroxide, and/or a soluble aluminate compound or a precursor of aluminate. Collectively, these methods may constitute enhanced, novel methods and materials for silica and Total Hardness reduction.

The process described herein may also provide particular advantages in that with silica and Total Hardness reduced, in addition to other alkaline earths and other contaminants contained within the layered double hydroxide, the solute composition is substantially simplified. This simplified solute composition, with reduced foulants/mineral precipitates, may facilitate much improved solute recovery in, for example, RO, allied membrane or ion-exchange technologies, or combinations thereof.

The methods defined herein can be considered particularly advantageous over conventional lime softening as it provides a multiplicity of silica and Total Hardness removal mechanisms. Importantly, the precipitates may be readily removed via settling or, for instance, physical methods such as DAF or membrane reactors in real time with high solute recovery (typically up to or exceeding 90%) thus conferring considerable operational advantages in terms of cost, time and extent of solute recovery.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A process for removing silica and reducing total hardness of a natural or waste water containing silica and scale-forming ions, the process comprising: adding (i) magnesium hydroxide or a precursor of magnesium hydroxide and (ii) a soluble aluminate compound or a precursor of aluminate to said water while maintaining the pH of said stream at pH >8 to produce layered double hydroxide in situ, wherein the layered double hydroxide contains the scale-forming ions in a lattice of the layered double hydroxide and silica is incorporated in the lattice of the layered double hydroxide as an interlayer anion and/or bound by the layered double hydroxide via one or more binding modes, wherein the process further comprises a recycling and regeneration step;
wherein the recycling and regeneration step comprises:
   a) removing layered double hydroxide from the process;
   b) regenerating and/or recycling at least a portion of the layered double hydroxide removed from the process to form regenerated and/or recycled layered double hydroxide; and
   c) reintroducing the regenerated and/or recycled layered double hydroxide back into the process.

2. The process according to claim 1, wherein the process is a continuous flow process.

3. The process according to claim 1, wherein the process is a batch or semi-batch process.

4. The process according to claim 1, wherein the layered double hydroxide in step a) is at least partially spent after capturing the silica from the water stream.

5. The process according to claim 1, wherein a portion of the layered double hydroxide is regenerated in step b) by calcining the layered double hydroxide.

6. The process according to claim 4, wherein the regenerated layered double hydroxide is reintroduced back into the process in step c) pre or post primary influent stream.

7. The process according to claim 1, wherein a portion of the partially spent layered double hydroxide removed from the process is recycled and reintroduced back into the process in step c) pre or post primary influent stream.

8. The process according to claim 1, wherein the process of step c) further comprises addition of one or more hydroxides to the process, wherein the one or more hydroxides is selected from the group consisting of i) layered double hydroxide, ii) calcined layered double hydroxide, and iii) layered double hydroxide forming agents such as magnesium hydroxide or a precursor of magnesium hydroxide, and/or a soluble aluminate compound or a precursor of aluminate.

9. The process according to claim 1, wherein the layered double hydroxide comprises hydrotalcite.

10. The process according to claim 1, wherein the layered double hydroxide comprises $[M^{(II)}_{1-x}M^{(III)}_{x}(OH)_2]^{x+}[A]_{x/n} \cdot mH_2O$ where $M^{(II)}$ is selected from $Mg^{2+}$, $Ca^{2+}$, $Mn^{2+}$, $Fe^{2+}$, $Co^{2+}$, $Ni^{2+}$, and $Zn^{2+}$; $M^{(III)}$ is selected from $Al^{3+}$, $Cr^{3+}$, $Mn^{3+}$, $Fe^{3+}$, $Co^{3+}$, and $Ga^{3+}$; A is selected from $Cl^-$, $Br^-$, $I^-$, $NO_3^-$, $CO_3^{2-}$, $SO_4^{2-}$, and/or organic anions; x is between 0 and 1, m is between 0 and 8, and n is anion charge.

11. The process according to claim 1, wherein the recycling and regeneration step comprises at least 10 cycles.

12. The process according to claim 1, wherein the pH of the water is maintained at pH from 8 to 11 with a pH buffering agent.

13. The process according to claim 12, wherein the pH buffering agent comprises a carbonate/bicarbonate pH buffer.

14. The process according to claim 1, wherein PFAS, PFOS are removed from the natural or waste water by incorporating PFAS, PFOS in the lattice of the layered double hydroxide as an interlayer anion and/or by binding to the layered double hydroxide via one or more binding modes.

15. The process according to claim 1, wherein organic contaminants comprising detergents, oils and petroleum hydrocarbons or mixtures thereof are removed from the natural or waste water by formation of inorganic-organic complexes with the layered double hydroxides formed in situ.

16. The process according to claim 1, wherein silica and the scale-forming ions are simultaneously removed from said water.

17. The process according to claim 1, wherein the layered double hydroxide formed in situ is recycled and mixed with a further water stream to remove contaminants therefrom.

18. The process according to claim 17, wherein the contaminants are removed via adsorption or ion-exchange processes with the layered double hydroxide.

* * * * *